United States Patent
Walters

(10) Patent No.: US 6,279,436 B1
(45) Date of Patent: Aug. 28, 2001

(54) METHOD FOR CUTTING A SEAT IN THE SETTING OF STONES IN JEWELRY

(76) Inventor: Jayce P. Walters, 955 51st St. North, Apt. 209, St. Petersburg, FL (US) 33710

( * ) Notice: Subject to any disclaimer, the term of this patent is extended or adjusted under 35 U.S.C. 154(b) by 0 days.

(21) Appl. No.: 09/648,707

(22) Filed: Aug. 25, 2000

Related U.S. Application Data

(62) Division of application No. 09/212,226, filed on Dec. 16, 1998, now Pat. No. 6,149,354.

(51) Int. Cl.[7] .................................................. B23B 1/00
(52) U.S. Cl. .............................. 82/1.11; 82/47; 63/10; 63/26
(58) Field of Search .................... 407/15, 16, 18, 407/12, 30, 31, 42, 51, 53, 54, 56, 57; 409/139, 140, 297; 82/1.11, 47; 29/10; 63/26

(56) References Cited

U.S. PATENT DOCUMENTS

| | | | |
|---|---|---|---|
| 450,618 | * 4/1891 | Hogg | 29/10 |
| 980,060 | 12/1910 | Buser . | |
| 1,494,517 | 5/1924 | Walter . | |
| 1,499,818 | 7/1924 | Franconetti . | |
| 1,546,814 | 7/1925 | Toy | 29/10 |
| 1,882,692 | 10/1932 | Albertson . | |
| 1,946,416 | 7/1934 | Seiler | 29/78 |
| 2,753,618 | 7/1956 | Stanziale | 29/103 |
| 3,283,663 | 11/1966 | Davis | 90/12 |
| 3,435,513 | 4/1969 | Knittweis | 29/567 |
| 3,751,795 | 8/1973 | Favre | 29/558 |
| 4,032,251 | 6/1977 | Ribich | 409/199 |
| 4,443,919 | 4/1984 | Guida et al. | 29/10 |
| 5,030,040 | 7/1991 | Wood | 408/59 |
| 5,305,506 | 4/1994 | Forman | 29/10 |
| 5,437,167 | * 8/1995 | Amber | 63/26 |
| 5,671,613 | * 9/1997 | Hoover et al. | 63/27 |
| 5,761,780 | * 6/1998 | Magi | 29/10 |
| 5,800,574 | * 9/1998 | Ricci et al. | 29/10 |
| 6,125,516 | * 10/2000 | Winkler | 29/10 |

* cited by examiner

*Primary Examiner*—Henry Tsai
(74) *Attorney, Agent, or Firm*—Senniger, Powers, Leavitt & Roedel

(57) ABSTRACT

A method of setting a gemstone having a profile including at least three notch surfaces in a jewelry setting includes the step of cutting notches into the inner surface of each setting prong. Each notch has as least three notch surfaces, each surface being complementary to a corresponding profile surface of the gemstone. The gemstone is set in the setting prongs so that portions of the gemstone profile surfaces are received in respective notches. The gemstone is secured within the setting by manually deforming the setting prongs such that the notch surfaces of each notch substantially conform to the corresponding profile surfaces of the gemstone.

4 Claims, 5 Drawing Sheets

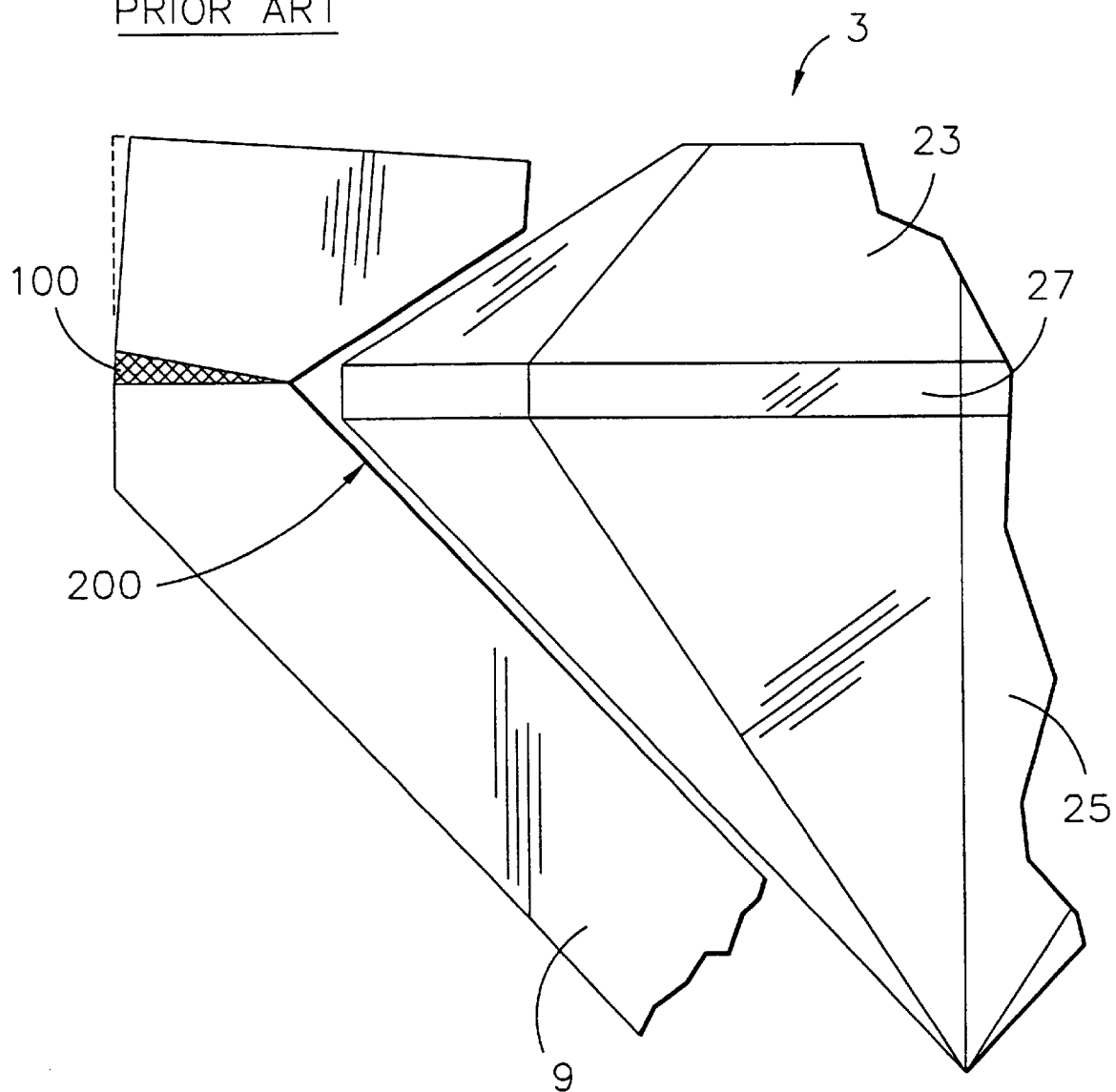

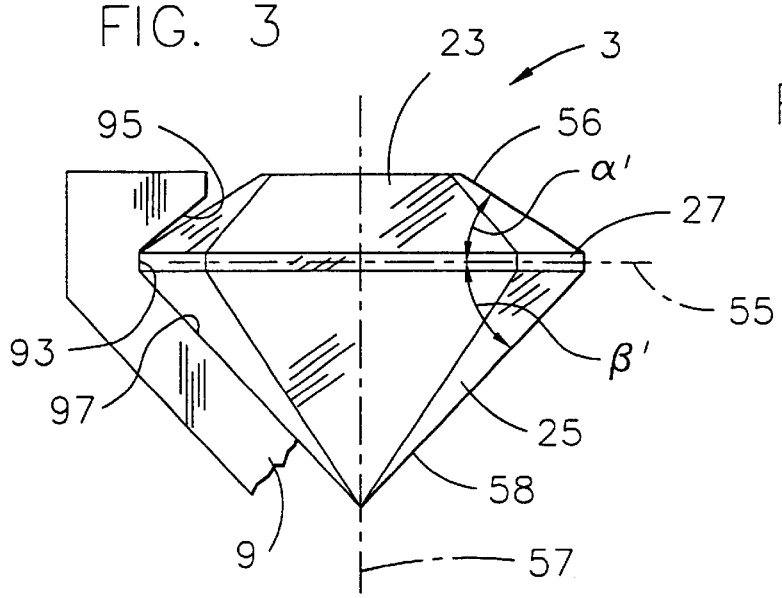
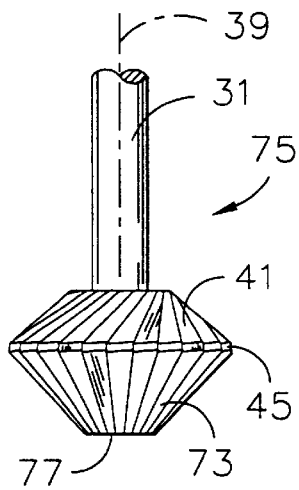
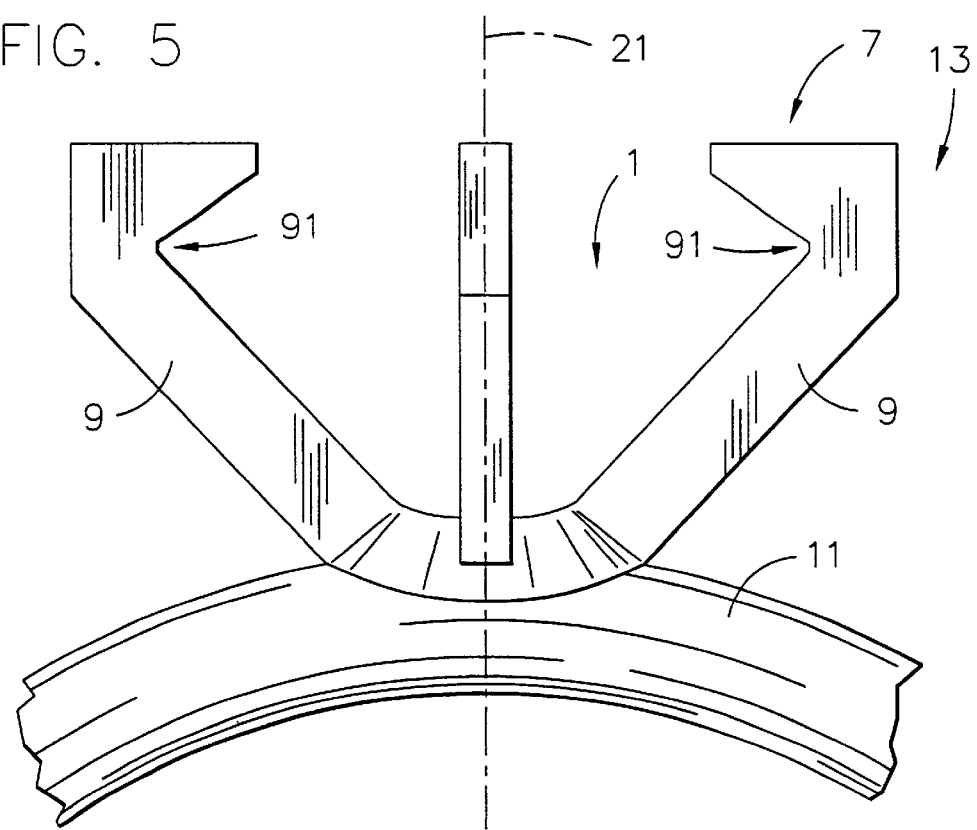

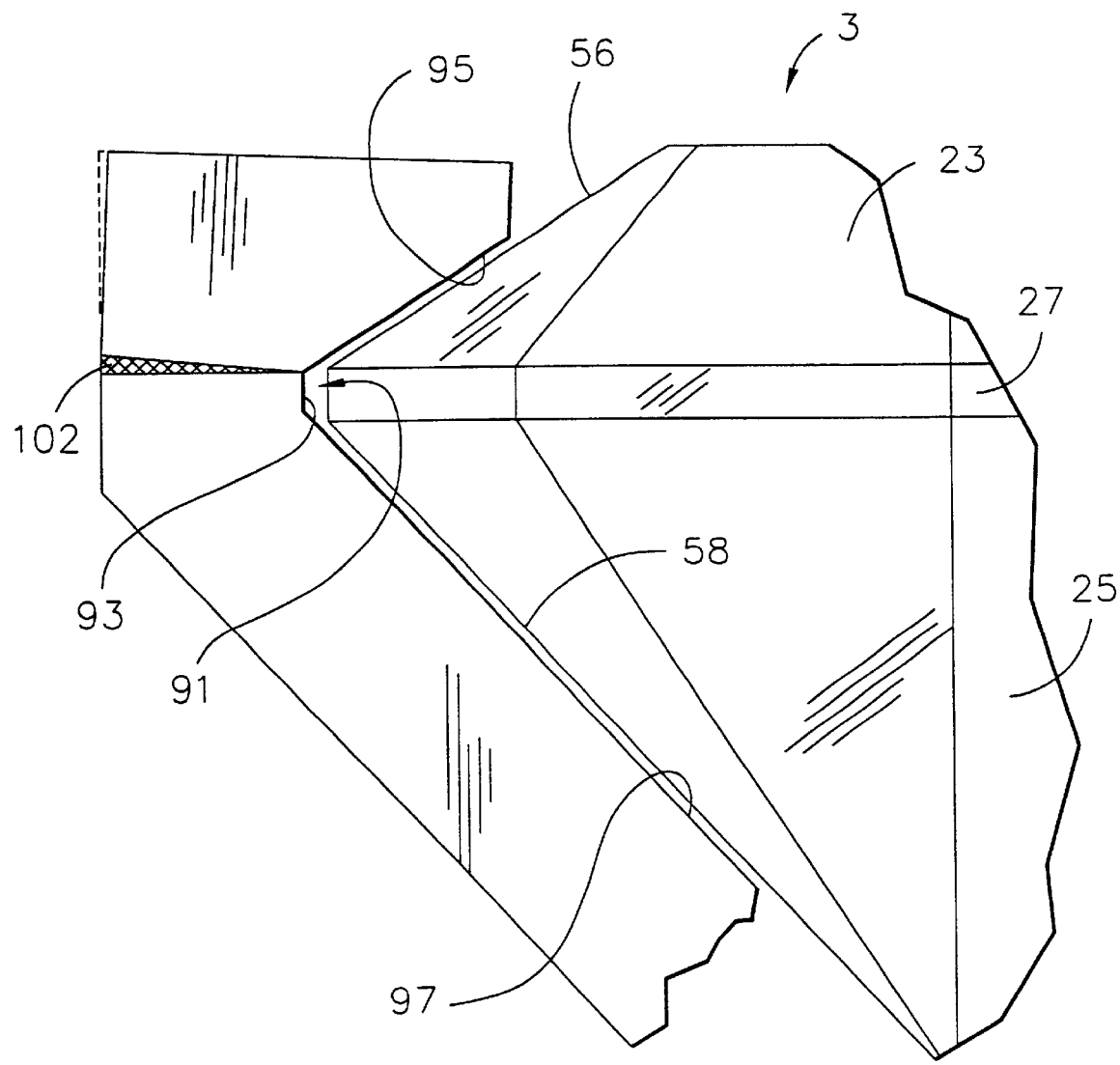

METHOD FOR CUTTING A SEAT IN THE SETTING OF STONES IN JEWELRY

CROSS REFERENCE TO RELATED APPLICATION

This application is a divisional of U.S. patent application Ser. No. 09/212,226, filed Dec. 16, 1998, which issued as U.S. Pat. No. 6,149,354 on Nov. 21, 2000.

BACKGROUND OF THE INVENTION

The present invention relates generally to a tool and method for creating a seat in jewelry for receiving a gemstone, and more particularly to such a tool shaped to more precisely form the seat to the gemstone.

Gemstones are set using a cutting tool to form a seat in a setting of the jewelry. The gemstone is positioned in the seat and the setting is deformed around the gemstone to secure it therein. Though successful, the methods and tools utilized in the prior art do not fully address structural considerations, alloy strengths, or stress-related fatigue with regard to the settings used to secure the gemstones. As a result, when settings are prepared using the methods and tools of the prior art, a substantial risk of weakening the structural integrity of the setting exists. Additionally, there is a significant risk that as the setting is being manually deformed, the crown and girdle of the gemstone could be damaged.

Typically, in the methods of the prior art, as illustrated in FIG. 1A, a notch 200 having two surfaces is cut into a setting, such as a prong-type setting having prongs 9, and a gemstone 3 is set into the notch, as shown in FIG. 1B. The gemstone has a crown, a pavilion, and a girdle between the crown and pavilion. As illustrated in FIG. 1B, the notch 200 must be cut deep enough to accommodate the girdle of the gemstone. When the girdle is positioned against the inner face of the setting, a gap is present between the crown of the gemstone being set and the setting in the notch. Once the gemstone is positioned, the setting is manually deformed and pressed against the crown of the gemstone, thus closing the gap and securing the gemstone within the setting. Referring to FIG. 1B, it may be seen that the notch 200 is V-shaped, but that the profile of the gemstone is polygonal. In order to receive the gemstone in the notch without a substantial gap between the inner surface of the notch and the girdle, the angle of the notch is substantially greater than the angle between the crown and pavilion of the gemstone. Thus, when the setting is bent to secure the gemstone in the notch, substantial plastic deformation of the setting occurs, as illustrated by the cross-hatched, triangular area 100 in FIG. 1C. A bending movement causes the inner face of the setting to be compressed, while the outer edge of the setting is elongated. These weakened setting areas are subject to chemical attack and reduced structural strength along grain boundaries.

Additionally, the present setting methods increase the potential of damage to the gemstone being set. Using the methods of the prior art, a setting prepared and manually deformed to secure the gemstone in place pinches the gemstone obliquely from above and below, but not uniformly on all sides of the gemstone being set. A gap, as shown in FIGS. 1B and 1C is created between the girdle of the gemstone and the setting. When the setting is manually deformed to secure the gemstone, the pressure applied to the gemstone on both sides of the gap can weaken the stone and cause this area of the gemstone to break, especially if the grain of the crystalline structure is aligned with the setting at a cleavage point of the stone.

SUMMARY OF THE INVENTION

Among the several objects and features of the present invention may be noted the provision of a tool and method for cutting a seat in a setting which more accurately forms the seat to conform to the profile of the gemstone; the provision of such a tool and method which reduce fatigue in the setting process when the gemstone is secured; and the provision of such a tool and method which lessen the opportunity to damage the gemstone.

Generally, a tool of the present invention comprises a cylindrical shank portion having a smooth outer surface and a bur cutting portion attached at one end. The bur cutting portion has cutting surfaces disposed for rotation about a longitudinal axis of the shank portion and includes three cutting surfaces. The first and second cutting surfaces are generally conical and the third, located between the two conical cutting surfaces, is generally cylindrical in shape. When employed, the tool cuts three distinct faces into the setting prongs to form the seat for the gemstone.

In another aspect of the present invention, a method of setting a gemstone having a profile including at least three notch surfaces in a metallic base generally comprises the step of cutting notches into the inner surface of each setting prong. Each notch has as least three notch surfaces, each surface being complementary to a corresponding profile surface of the gemstone. The gemstone is set in the setting prongs so that portions of the gemstone profile surfaces are received in respective notches. The gemstone is secured within the base by manually deforming the setting prongs such that the notch surfaces of each notch substantially conform to the corresponding profile surfaces of the gemstone.

Other objects and features will be in part apparent and in part pointed out hereinafter.

BRIEF DESCRIPTION OF THE DRAWINGS

FIG. 1C is an enlarged fragmentary perspective showing a gemstone set in the setting of FIG. 1A;

FIG. 3 is an elevational view showing a gemstone set in the setting of FIG. 2 after the seat is cut;

FIG. 3A is an enlarged fragmentary perspective showing a gemstone set in the setting of FIG. 2;

FIG. 4 is an elevational view showing a second embodiment of the tool of FIG. 2; and FIG. 5 shows a fragmentary elevational view of a ring having a setting formed with a seat according to the present invention.

Corresponding reference characters indicate corresponding parts throughout the drawings.

DETAILED DESCRIPTION OF THE PREFERRED EMBODIMENT

Figure 2:
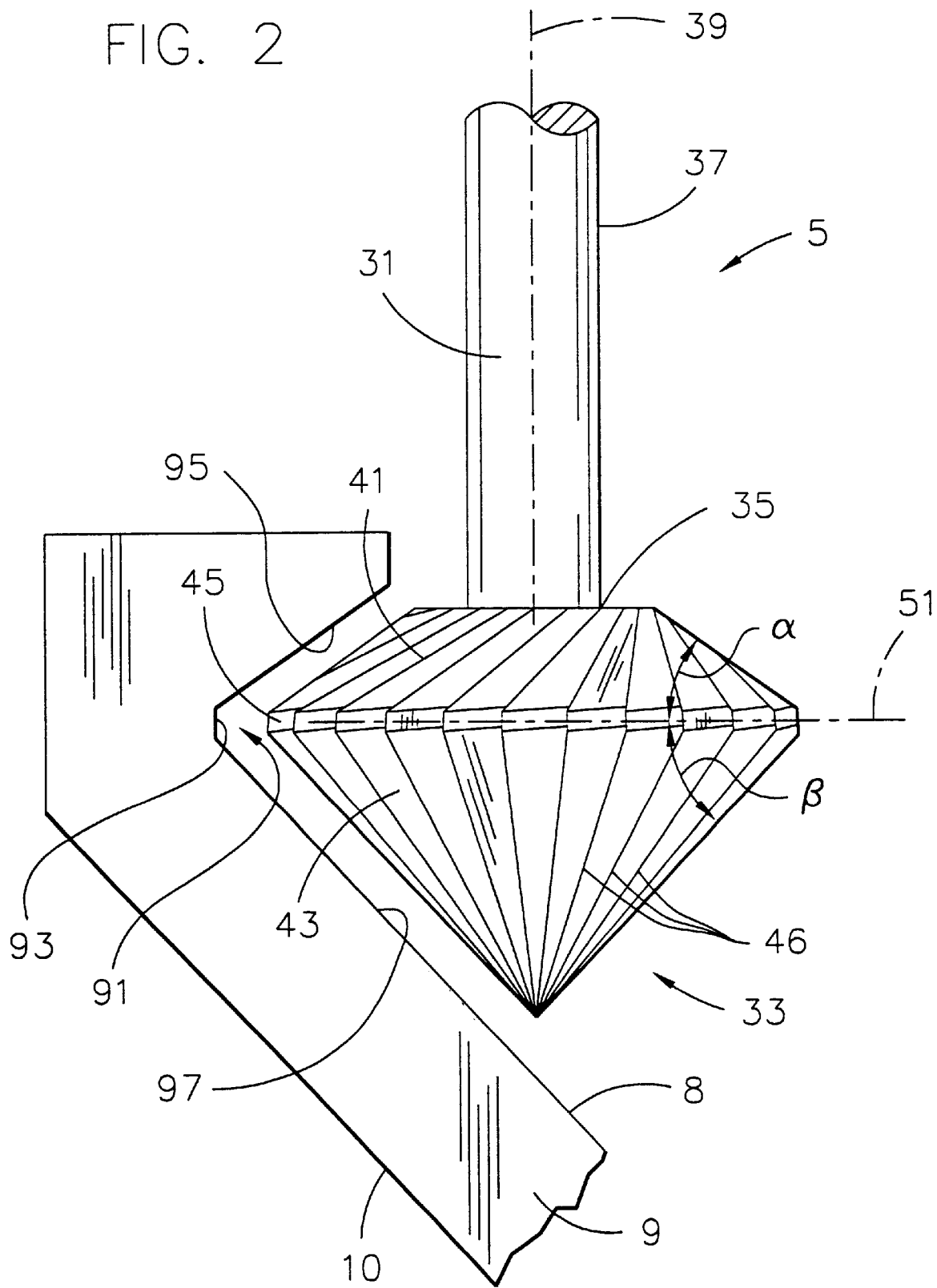
FIG. 2 is an elevational view showing the preferred embodiment of the tool of the present invention cutting a seat in a setting.

Referring now to the drawings and in particular to FIG. 2, a tool for cutting a seat 1 in a setting 7 of jewelry, such as a ring 13 (FIG. 5) is generally indicated at 5. For purposes of describing the present invention, the setting 7 of the illustrated embodiments herein is a prong-type setting having multiple prongs 9 spaced around the location where a gemstone 3 will be received. For simplicity, only one setting prong 9 has been illustrated in FIGS. 2, 3, and 3A. It is understood, however, that bezel-type settings, bead type settings and other commonly used jewelry settings may be used instead of the prong-type setting and remain within the scope of this invention.

The setting prongs 9 are integrally attached to a base 11 of the ring 13 each equidistantly spaced relative to an axis of symmetry 21 extending generally through the center of the base. The gemstone 3, as shown in FIG. 3, has an upper crown section 23, a lower pavilion section 25, and a girdle section 27 intermediate the crown and pavilion sections. The tool 5, as shown in FIG. 2, comprises a rotatable cylindrical shank portion 31 and a bur cutting portion, generally indicated at 33, mounted on an end 35 of the shank portion. The shank portion 31 has a smooth outer surface 37 and is constructed for attachment to a rotary tool (not shown), such as jeweler's lathe, for rotation of the shank portion and bur cutting portion 33 about a longitudinal axis 39 of the shank portion.

The bur cutting portion 33 is constructed in one piece, but for purposes of the description will be described as having three individual cutting surfaces 41,43,45. The bur cutting portion 33 comprises a first generally conical cutting surface 41, a second generally conical cutting surface 43, and a generally cylindrical cutting surface 45 disposed between the first conical cutting surface and the second conical cutting surface. The cutting surfaces 41,43,45 are disposed for rotation and are generally symmetrical about the longitudinal axis 39 of the cylindrical shank portion 31. The first conical cutting surface 41 and the second conical cutting surface 43 are shaped so that their bases are adjacent to the generally cylindrical cutting surface 45.

The first generally conical cutting surface 41 extends from its base to the cylindrical shank portion 31 in the form of a frustum. This cutting surface 41 is disposed at an oblique angle α in relation to a reference plane 51 extending perpendicular to the longitudinal axis 39 of the shank portion 31. In the preferred embodiment of the tool 5, the oblique angle α is equal to or greater than a corresponding angle α' formed between a reference plane 55 extending perpendicular to a longitudinal axis 57 of the gemstone 3, and an outer surface 56 of the crown section 23 of the gemstone 3 being set (FIG. 3). For example, when setting diamonds using the preferred embodiment, the oblique angle α relating to the cutting surface 41 of the tool 5 is preferably 5–10° greater than its corresponding angle α' of the gemstone 3.

In the preferred embodiment, the second generally conical cutting surface 43 extends from its base to form an apex. This cutting surface 43 is disposed at an oblique angle β in relation to a reference plane 51 extending perpendicular to the longitudinal axis 39 of the shank portion 31. In the preferred embodiment of the tool 5, the oblique angle β is equal to or greater than a corresponding angle β' formed between a reference plane 55 perpendicular to the longitudinal axis 57 of the gemstone 3 and an outer surface 58 of the pavilion section 25 of the gemstone being set. For example, when setting diamonds using the preferred embodiment, the oblique angle β relating to the cutting surface 43 of the tool 5 is preferably 5–10° greater than its corresponding angle β' of the gemstone 3. The second generally conical cutting surface 43 is designed to cut an accurate seat 1 in the setting prongs 9 of the jewelry 7. Additionally, this design minimizes the amount of metal that must be removed from the setting prong 9.

The cutting surfaces 41, 43, 45 are illustrated herein as having a flat or linear profile. However, it is contemplated that the cutting surfaces 41, 43 45 may be other than linear, such as convex, concave or other suitable profile, without departing from the scope of this invention.

FIG. 4 shows a second embodiment of a tool (indicated generally at 75) of the present invention having a truncated second cutting surface 73. The second cutting surface 73 is preferably in the form of a frustum having a smooth bottom face 77. This embodiment provides less interference when cutting seats 1 on a basket-type setting. A basket-type setting is used with gemstones (not shown) having a shallow profile in which the cross-sectional diameter of the girdle is greater in length than the distance measured between the crown and the apex of the pavilion of the gemstone. In that event, it will be understood that the "longitudinal axis" as used herein extends from the crown to the pavilion and not diametrically. Such gemstones require a setting in which the notch surface corresponding to the girdle be positioned closer to the base of the prong. This embodiment enables such a seat to be accurately cut.

It is also contemplated that the bottom face 77 of the truncated second cutting surface 73 could be shaped to define a fourth cutting surface (not shown) without departing from the scope of this invention.

The cylindrical cutting surface 45, as seen in FIG. 2, is integrally disposed between the bases of the first and second generally conical cutting surfaces 41,43. The cylindrical cutting portion 45 is disposed generally parallel to the longitudinal axis 39 of the shank portion 31. In the preferred embodiment, the first and second conical surfaces 41,43 and the cylindrical cutting surface 45 are positioned co-axially with the longitudinal axis 39 of the shank portion 31.

The cutting surfaces 41,43,45 have a plurality of closely arranged sharpened cutting teeth 46 formed therein. Each of the cutting teeth 46 is obliquely disposed at a lateral inclination with respect to the longitudinal axis 39 of the cylindrical shank portion 31. The cutting teeth 46 extend from the top of the first generally conical cutting surface 41 over the cylindrical cutting portion 45 to the apex of the second generally conical cutting surface 43.

Prior to using the tool of the present invention, the setting prongs 9 have substantially uniform thickness along their lengths and are generally smooth on their inner surfaces 8 and outer surfaces 10. In use, the bur cutting portion 33 is positioned to allow the cutting teeth 46 to engage a setting prong 9 whereby moving the rotating tool 5 in a direction generally parallel to a reference line 51 extending perpendicular to the longitudinal axis 39 of the shank portion 31 to contact the inner surface 8 of a setting prong 9. This contact causes material to be removed from the setting prong 9 to form a notch 91 in the inner face 8 of the setting prong. The tool 5 cuts a notch 91 having three distinct surfaces 93,95,97 into the inner surface 8 of each setting prong 9. It is to be understood that the tool 5 may be formed to cut additional surfaces without departing from the scope of the present invention.

The notch surfaces 93,95,97 include a first surface 93 generally parallel to the axis of symmetry 21 of the setting prongs 9 of the jewelry 7, and second and third surfaces 95,97 generally oblique to the same axis of symmetry. The first surface 93 of the notch 91 is positioned between the two oblique surfaces 95,97 of the notch. The second surface 97 of the notch 91 is located below the first surface 93 of the notch and is closest to the base 11 of the ring 13. The third surface 95 of the notch 91 is located above the first surface 93 of the notch as seen in FIG. 3A. Each notch surface 93,95,97 is complimentary to a corresponding profile surface 23,25,27 of the gemstone 3 being set.

The method is repeated on the remaining setting prongs 9 to form the seat 1 for the gemstone 3. The tool 5 is employed to cut notches 91 in all of the setting prongs 9 such that corresponding profile surfaces 93,95,97 in the notches are equidistantly spaced relative to an axis of symmetry 21 of the setting prongs extending generally through a center of a base 11 of the jewelry 7, as shown in FIG. 5.

Figure 1A:
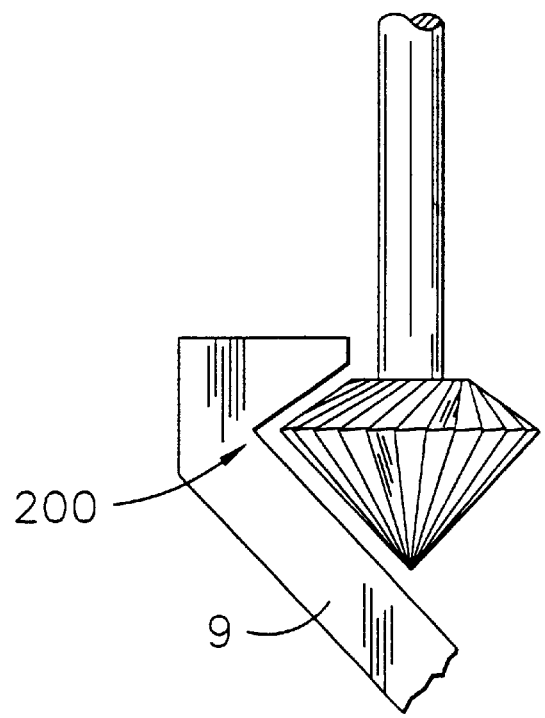
FIG. 1A is an elevational view of a tool of the prior art cutting a seat in a jewelry setting.
Figure 1B:
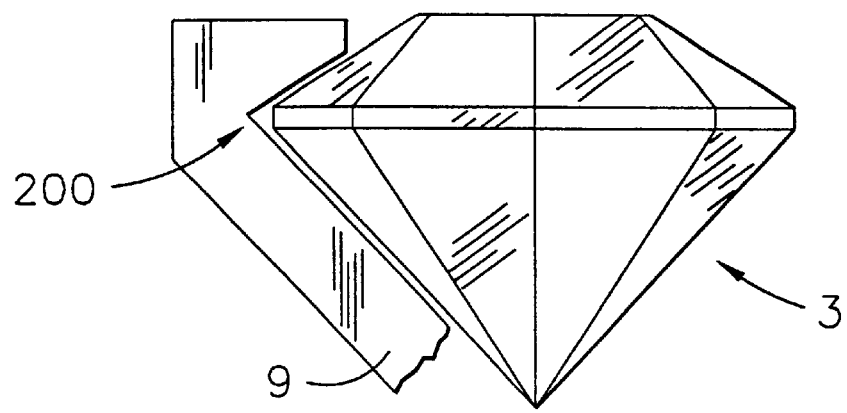
FIG. 1B is an elevational view of a gemstone set in the setting after the tool of the prior art has completed shaping the setting.

As seen in FIG. 3, the gemstone 3 is set in the base 11 of the jewelry 7 so that portions of the gemstone profile surfaces 23,25,27 are received generally against their respective notches 91, i.e., the pavilion 25 of the gemstone is received against the second surface 97 of the notch, the girdle 27 is received against the first surface 93 of the notch and the crown 23 is received against the third surface 95 of the notch. The gemstone 3 is secured within the base 11 of the jewelry 7 by manually deforming the setting prongs 9 such that the profile surfaces of the notch 93,95,97 substantially conform to the corresponding profile surfaces 23,25,27 of the gemstone. Typically, there will initially be some space between the crown 23 and the first surface 93 of each notch 91 to permit deformation of the prong 9 against the gemstone 3. The tool 5 and method of the present invention cut a more accurate shape into the setting prongs 9, thus minimizing the amount of metal that must be removed to form the gemstone seat 1. Because the notch 91 is shaped in close correspondence to the profile of the gemstone 3, the bending movement of the setting prong 9 is minimized during its manual deformation. The amount of bending is illustrated in FIGS. 1C and 3A in the upper left hand corner of the prongs 9 by showing the undeformed position of the corner of the prong in phantom lines. An area of grain boundary compression and elongation, indicated by the cross-hatched triangular area 102 in FIG. 3A, in the setting prong 9 is less than a corresponding area 100 which occurs in prongs cut by tools of the prior art (FIG. 1C). As a result, there is less deformation of the setting 7 and less potential of weakening the setting to the extent that repair is needed.

It will be observed from the foregoing that the tool and method described herein satisfy the various objectives of the present invention and attain other advantageous results. Providing the cylindrical cutting surface 45 between the generally conical cutting surfaces 41,43 shapes the notch 91 closely to the shape of the profile of the gemstone. The amount of material removed from the setting 7 is less because the notch 91 does not have to be as deep or as wide as in the prior art. By leaving material in, the setting 7 is stronger and better able to handle deformation in securing the gemstone 3 and subsequent daily wear and tear. The notch 91 created by the tool 5 reduces the pinching of the gemstone 3 by the setting 7 when they are manually deformed. The closer correspondence of the notch 91 to the profile of the gemstone 3 also reduces the area 102 of stress created in the setting 7, thus helping to maintain the alloy integrity of the setting prongs.

As various changes could be made in the above constructions without departing from the scope of the invention, it is intended that all matter contained in the above description or shown in the accompanying drawings shall be interpreted as illustrative and not in a limiting sense.

What is claimed is:

1. A method of setting a gemstone having a profile into a metallic base having a setting of substantially uniform thickness, the gemstone profile including at least three distinct surfaces, the method comprising the steps of:

cutting at least one notch into an inner surface of the setting, said at least one notch having at least three notch surfaces, each notch surface being complementary to a corresponding profile surface of the gemstone;

setting the gemstone in the setting so that portions of the gemstone profile surfaces are received in a respective notch;

securing the gemstone within the base by manually deforming the setting such that the notch surfaces of each notch substantially conform to the corresponding profile surfaces of the gemstone.

2. A method as set forth in claim 1 wherein the surfaces of each notch include a first surface generally parallel to the axis of symmetry, and second and third surfaces which are generally oblique to the axis of symmetry.

3. A method as set forth in claim 1 wherein said the first surface of each notch is positioned between the second and third surfaces.

4. A method of setting a gemstone having a profile into a metallic base having a setting of substantially uniform thickness, the gemstone profile including at least three distinct surfaces, the method comprising the steps of:

cutting at least one notch into an inner surface of the setting, said at least one notch having at least three notch surfaces and a pair of corners respectively formed by adjacent notch surfaces, each notch surface being complementary to a corresponding profile surface of the gemstone;

setting the gemstone in the setting so that portions of the gemstone profile surfaces are received in a respective notch;

securing the gemstone within the base by manually deforming the setting generally along at least one of said corners such that the notch surfaces of each notch substantially conform to the corresponding profile surfaces of the gemstone.

* * * * *